United States Patent
Wang et al.

(10) Patent No.: US 10,408,238 B2
(45) Date of Patent: Sep. 10, 2019

(54) CONTROL STRATEGY FOR HYDRAULIC ACTUATOR WITH A PAIR OF INDEPENDENT METERING VALVES

(71) Applicant: Eaton Intelligent Power Limited, Dublin (IE)

(72) Inventors: Meng Wang, Eden Prairie, MN (US); Michael Berne Rannow, Eden Prairie, MN (US)

(73) Assignee: Eaton Intelligent Power Limited, Dublin (IE)

( * ) Notice: Subject to any disclaimer, the term of this patent is extended or adjusted under 35 U.S.C. 154(b) by 71 days.

(21) Appl. No.: 15/808,373

(22) Filed: Nov. 9, 2017

(65) Prior Publication Data

US 2018/0128292 A1    May 10, 2018

Related U.S. Application Data

(60) Provisional application No. 62/419,569, filed on Nov. 9, 2016, provisional application No. 62/419,537, filed
(Continued)

(51) Int. Cl.
*F16D 31/02* (2006.01)
*F15B 13/04* (2006.01)
(Continued)

(52) U.S. Cl.
CPC ........ *F15B 13/0417* (2013.01); *F15B 11/006* (2013.01); *F15B 13/0402* (2013.01); *F15B 13/0442* (2013.01); *F15B 21/02* (2013.01); *F15B 21/085* (2013.01); *F15B 21/087* (2013.01); *F15B 11/08* (2013.01); *F15B 2013/0409* (2013.01); *F15B 2211/20546* (2013.01); *F15B 2211/30575* (2013.01);
(Continued)

(58) Field of Classification Search
CPC ............ F15B 11/006; F15B 2013/0409; F15B 13/0417; F15B 13/0442; F15B 21/087
USPC .............................................. 60/461; 91/465
See application file for complete search history.

(56) References Cited

U.S. PATENT DOCUMENTS 5,138,838 A * 8/1992 Crosser ................. F15B 21/087
60/461
6,220,288 B1 * 4/2001 Sandau ................. F15B 11/003
91/465
(Continued)

*Primary Examiner* — Michael Leslie
(74) *Attorney, Agent, or Firm* — Merchant & Gould P.C.

(57) ABSTRACT

Systems and methods for controlling valve assemblies associated with an actuator in an electro-hydraulic system are disclosed. In one method, a controller monitors hydraulic fluid flow for an actuator to identify one valve assembly connected to the actuator as a meter-in valve and another valve assembly connected to the actuator as a meter-out valve. In one aspect, the valve assembly most recently identified as the meter-in valve is controlled to maintain a pressure setpoint and the valve assembly most recently identified as the meter-out valve is controlled to maintain a hydraulic fluid flow rate. The method can also include determining whether the actuator is in a passive state or an overrunning state and controlling the valve most recently identified as the meter-in valve to maintain a first pressure setpoint when the actuator is in a passive state and to maintain a second pressure setpoint when the actuator is in an overrunning state.

16 Claims, 8 Drawing Sheets

Related U.S. Application Data on Nov. 9, 2016, provisional application No. 62/419,540, filed on Nov. 9, 2016.

(51) Int. Cl.
*F15B 13/044* (2006.01)
*F15B 11/00* (2006.01)
*F15B 21/02* (2006.01)
*F15B 21/08* (2006.01)
*F16K 37/00* (2006.01)
*F15B 11/08* (2006.01)
*G01F 1/36* (2006.01)
*G01F 15/00* (2006.01)

(52) U.S. Cl.
CPC ..... *F15B 2211/455* (2013.01); *F15B 2211/46* (2013.01); *F15B 2211/634* (2013.01); *F15B 2211/6313* (2013.01); *F15B 2211/6346* (2013.01); *F15B 2211/6656* (2013.01); *F15B 2211/7053* (2013.01); *F15B 2211/7058* (2013.01); *F15B 2211/761* (2013.01); *F15B 2211/855* (2013.01); *F16K 37/00* (2013.01); *G01F 1/36* (2013.01); *G01F 15/005* (2013.01)

(56) References Cited

U.S. PATENT DOCUMENTS 8,635,939 B2 * 1/2014 Linjama .................. F04B 49/22
　　　　　　　　　　　　　　　　　　　　91/465
9,423,800 B2 * 8/2016 Rannow .................. F15B 20/00

* cited by examiner

CONTROL STRATEGY FOR HYDRAULIC ACTUATOR WITH A PAIR OF INDEPENDENT METERING VALVES

RELATED APPLICATIONS

This application claims priority to U.S. Provisional Patent Application Ser. No. 62/419,537, filed on Nov. 9, 2016, the entirety of which is incorporated by reference herein. This application also claims priority to U.S. Provisional Patent Application Ser. No. 62/419,540, filed on Nov. 9, 2016, the entirety of which is incorporated by reference herein. This application further claims priority to U.S. Provisional Patent Application Ser. No. 62/419,569, filed on Nov. 9, 2016, the entirety of which is incorporated by reference herein.

BACKGROUND

Work machines, such as off-highway vehicles, fork lifts, wheel loaders, track loaders, excavators, backhoes, bull dozers, and telehandlers are known. Work machines can be used to move material, such as pallets, dirt, and/or debris. The work machines typically include a work implement (e.g., a fork) connected to the work machine. The work implements attached to the work machines are typically powered by a hydraulic system. The hydraulic system can include a hydraulic pump that is powered by a prime mover, such as a diesel engine. Work machines are commonly provided with electronic control systems that rely upon a number of inputs and outputs, for example, pressure sensors, position sensors, and valve actuators. Electro-hydraulic valves often rely on sensed values, such as port pressure and/or valve position to provide a stable, controlled flow to and from a hydraulic actuator, such as a linear actuator or motor.

One known approach to improve work machine performance is to reduce throttling losses associated with valve control actuators by using independent metering control. If two proportional valves can independently control the two chambers of a typical linear actuator (cylinder) or a rotary actuator (motor), both improved motion accuracy and reduced energy consumption can be realized at the same time. However, typical control approaches for such an arrangement can introduce discontinuity in motion control.

SUMMARY

The disclosed systems and methods overcome the discontinuity on actuator motion control while taking the advantage of independent metering for minimizing throttling losses. One approach to achieving this functionality is by providing a method for controlling valve assemblies associated with an actuator in an electro-hydraulic system that includes the steps of providing first and second valve assemblies, each valve assembly having at least one of a pressure sensor and a position sensor in communication with an electronic system controller, the valve assemblies being in fluid communication with the hydraulic actuator; monitoring hydraulic fluid flow to identify either of the first and second valve assemblies as a meter-in valve in which hydraulic fluid flow from the valve assembly to the actuator and the other of the first and second valve assemblies as a meter-out valve in which hydraulic fluid flows from the actuator to the valve assembly; controlling the valve most recently identified as the meter-in valve to maintain a pressure setpoint value; and controlling the valve most recently identified as the meter-out valve to maintain a hydraulic fluid flow rate value. In one aspect, the method can further include determining whether the actuator is in a passive state or an overrunning state and controlling the valve most recently identified as the meter-in valve to maintain a first pressure setpoint value when the actuator is in a passive state and to maintain a second pressure setpoint value when the actuator is in an overrunning state. In one aspect, the step of controlling the valve most recently identified as the meter-in valve is controlled with reference to hydraulic pressure at a location between the meter-out valve and the actuator.

DESCRIPTION OF THE DRAWINGS

Non-limiting and non-exhaustive embodiments are described with reference to the following figures, which are not necessarily drawn to scale, wherein like reference numerals refer to like parts throughout the various views unless otherwise specified.

DETAILED DESCRIPTION

Figure 1:
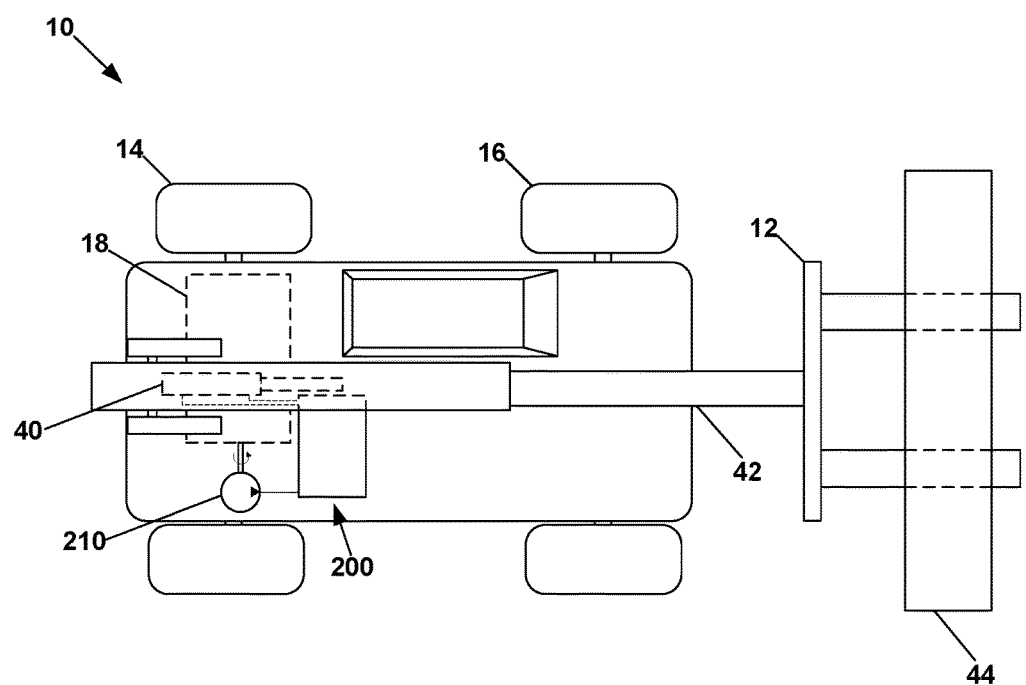
FIG. 1 is a schematic view of a work machine having features that are examples of aspects in accordance with the principles of the present disclosure.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

The disclosed systems and methods provide for improved operational performance for actuator systems having independent metering valves. An example valve assembly manufactured by the assignee of this application is the Eaton CMA Advanced Mobile Valve with Independent Metering (e.g. models CMA 90, CMA 200). Some valve assemblies, such as the CMA valve assembly, include functions to intelligently control the valve's attached actuator. An example control strategy for an independent metering valve system is built based on the actuator's loading condition. The control strategy is explained in the following paragraphs.

If the actuator moves with a passive load, the meter-in side operates in a flow control mode to control the motion of the actuator, and the meter-out side operates in a pressure control mode to guarantee a low meter out pressure. The meter-in valve is the valve from which fluid is being fed through the valve and to the actuator while the meter-out valve is the valve to which fluid flows from the opposite side of the actuator. The valves switch between these two designations depending upon the desired directional control of the actuator. By use of the term "flow control mode" it is meant to indicate that the valve is controlled to maintain a fluid flow setpoint. By use of the term "pressure control mode" it is meant to indicate that the valve is controlled to maintain a fluid pressure setpoint. By use of the term "passive condition" it is meant to indicate that the load is being forced in a direction by the actuator that is generally opposite the direction of an external opposing force, such as gravity (e.g. such as when a load is being lifted).

If the actuator moves with an overrunning load, the meter-in side operates in pressure control mode to prevent cavitation, and the meter-out side operates in flow control mode to control the motion of the actuator. By use of the term "overrunning condition" it is meant to indicate that the load is moving in a direction that is in the same general direction of an external force, such as gravity (e.g. such as when a load is falling).

Figure 6:
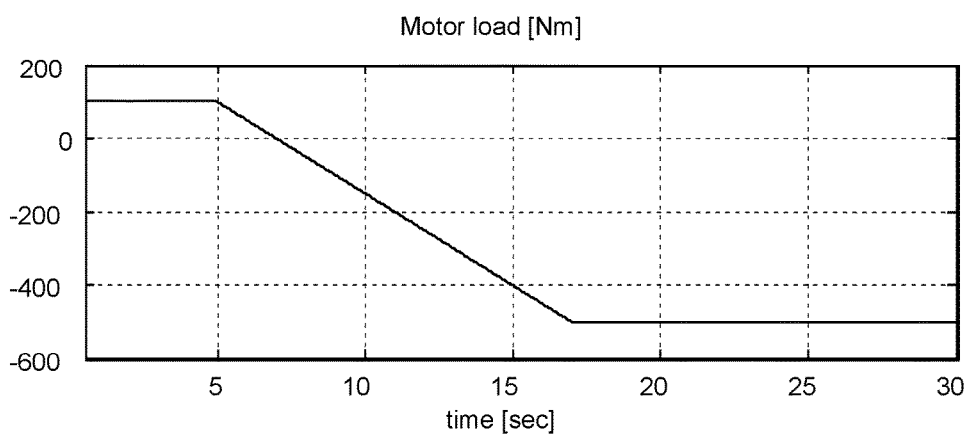
FIG. 6 is a graph showing a varying load that could be applied to the work machine of FIG. 1 and systems of FIGS. 2 and 2A.

With reference to FIG. 6, a graph showing motor or actuator load with respect to time is shown. In this figure, the motor load is non-zero and constant up to the 5 second point at about 150 Nm. At this condition, the load can be said to be passive as the load is moving in a direction opposite an external force, such as gravity. Between the 5 seconds and about 17 seconds on the graph, the load decreases from about 150 Nm to about −500 Nm. After about 17 seconds, the load is constant at about −500 Nm. At about 7 seconds, the load falls below 0 Nm after which point the load is moving in the same direction as an external force, such as gravity, which causes the system to be in an overrunning state. Accordingly, as the load transitions from being positive to negative, the load switches from being a passive load to an overrunning load and the valves switch their mode of operation (e.g. from pressure control to flow control or vice-versa). If the load were to increase from −500 Nm back to a positive number, the valves would again switch their mode of operation as soon as the load crosses into being a positive value.

Figure 7:
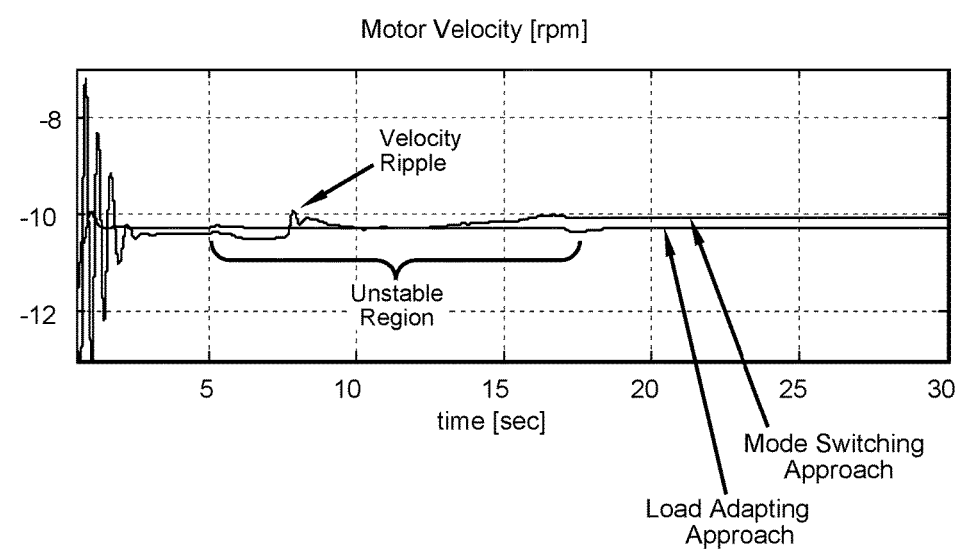
FIG. 7 is a graph showing the resulting actuator velocity with the system responding to the varying load shown in FIG. 6, the graph showing velocities associated with a mode switching approach and a load adapting approach.
Figure 8:
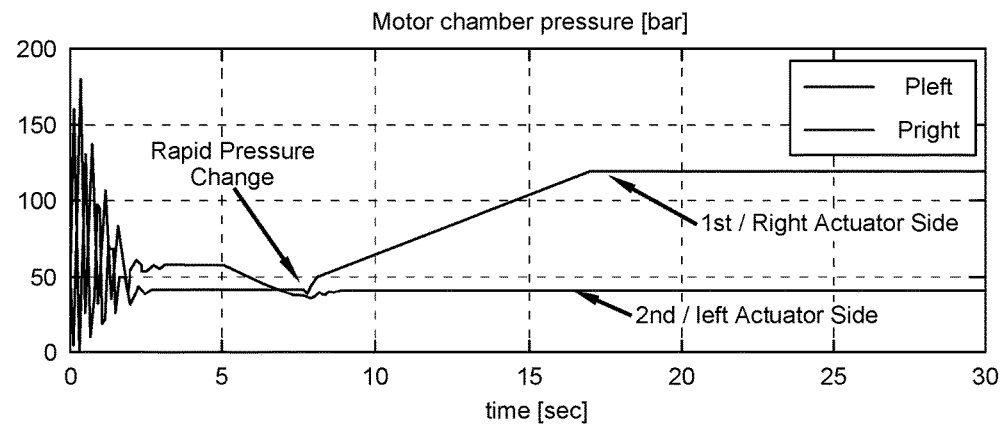
FIG. 8 is a graph showing a resulting left/right system actuator chamber pressures with the system configured to respond to the varying load shown in FIG. 6 with the mode switching approach.

This control logic can work very well, especially for linear actuators. However, as the loading condition varies (i.e. switching between overrunning and passive), the valves will switch their operation mode, and correspondingly causes a discontinuity to the actuator's motion control output. As a consequence, a velocity ripple is introduced to the actuator, which is not preferred. This velocity ripple can be observed at FIG. 7 where it can be seen that motor velocity very suddenly changes at about 7 seconds. It can also be observed that the motor speed becomes less stable or less linear in an unstable region during the time span during which the load is varying between about 5 seconds and about 17 seconds. Before 5 seconds and after 17 seconds, the motor speed is relatively more linear and stable. These conditions are the result of a rapid or sharp change in actuator chamber pressure when the valves switch control modes at about the 7 second mark, as can be seen at FIG. 8.

Figure 9:
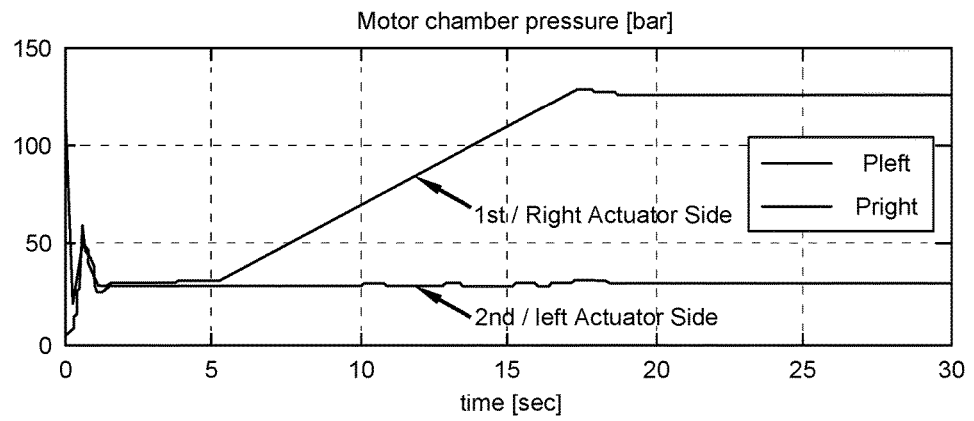
FIG. 9 is a graph showing a resulting left/right system actuator chamber pressures with the system configured to respond to the varying load shown in FIG. 6 with the load adapting approach.

The avoidance of such a flow/velocity ripple may be somewhat mitigated with tremendous efforts on mode switching conditions and reference signal design during transition. However, the robustness of such a control effort with respect to different loading conditions can be very difficult to guarantee. The difficulty in addressing this problem is even further increased in applications where the actuator is a hydraulic motor, whose operation has more frequent loading condition switching. The disclosed systems and methods of this application, which are disclosed in more detail below, alternatively utilize a load adapting approach that provides stable motor speeds under varying load conditions and without the introduction of a velocity ripple. FIG. 7 shows the elimination of the velocity ripple for the load adapting approach while FIG. 9 shows that the chamber pressures are stable and only gradually change in response to the varying load. As is explained in further detail below, the load adapting approach responds to varying load conditions without switching the control mode of the meter-in and meter-out valves.

General System Description

As depicted at FIG. 1, a work machine 10 is shown. Work machine 10 includes a work attachment 12 for performing a variety of lifting tasks associated with a load 44. In one embodiment, work machine 10 is a telehandler having a telescoping boom 42 that supports the work attachment 12. In one embodiment, the work attachment 12 includes a pair of forks. However, one skilled in the art will appreciate that work attachment may be any hydraulically powered work implement.

Work machine 10 is also shown as including at least one drive wheel 14 and at least one steer wheel 16. In certain embodiments, one or more drive wheels 14 may be combined with one or more steer wheels 16. The drive wheels are powered by an engine 18. Engine 18 is also configured to power a hydraulic system including a work circuit 200 and a steering circuit (not shown) of the work machine 10 via at least one hydraulic pump 210. In one embodiment, pump 32 is mechanically coupled to the engine 18, such as by an output shaft or a power take-off. In one embodiment, pump 32 is powered indirectly by the engine 18 via a hydraulic system. The work circuit 200 actuates the work attachment 12 by operation of the pump in cooperation with a number of hydraulic actuators 40 and control valves 20, 120. In one embodiment, the work machine includes hydraulic actuators and valves for effectuating lifting, extending, tilting, and sideways motions of the work attachment 12.

Hydraulic System

Figure 2:
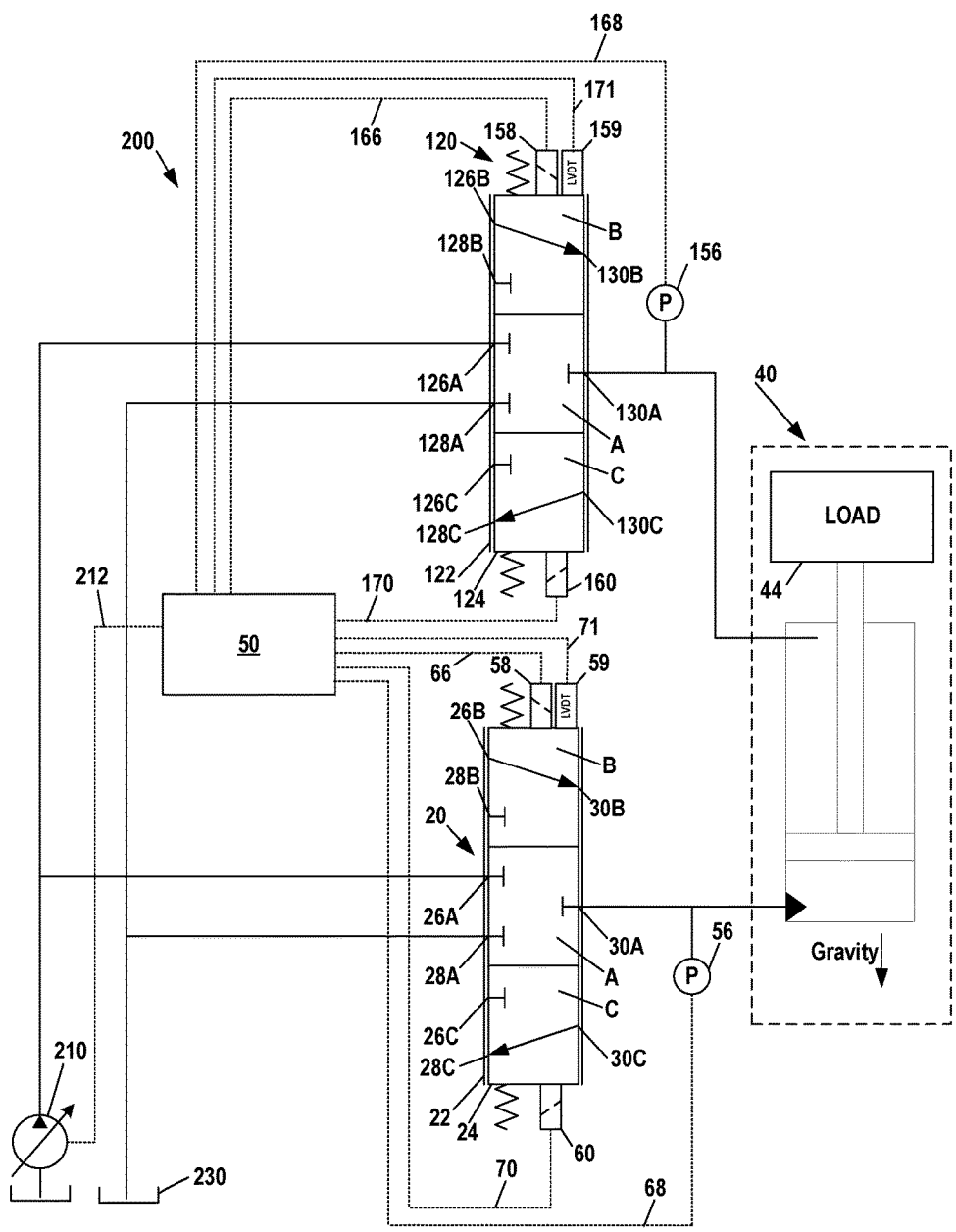
FIG. 2 is a schematic view of a portion of an electro-hydraulic system including a work circuit and actuator suitable for use in the work machine shown in FIG. 1.

Referring to FIG. 2, an example of a hydraulic system including a work circuit 200 and other components are shown. Work circuit 200 is for activating a work attachment of a work machine. As shown, work circuit 200 includes a first valve assembly 20 and a second valve assembly 120 for enabling a work function, such as an attachment lift function. Work circuit 200 may also include a plurality of additional valves and/or fluid power consuming components for enabling other functions in the hydraulic system. Furthermore, the work circuit may include a single valve assembly that combines the functions of the first and second valve assemblies 20, 120. In the particular embodiment shown, the first and second valve assemblies 20, 120 are proportional valves having a sleeve 22, 122 within which a spool 24, 124 is disposed.

Figure 2A:
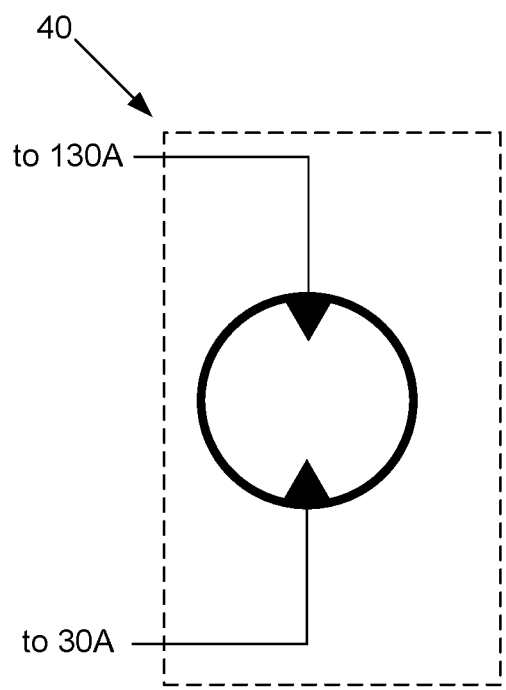
FIG. 2A is a schematic of a hydraulic motor usable within the system shown in FIG. 2.

The first valve assembly 20 is configured and arranged to selectively provide pressurized fluid from pump 210 to one or more actuators 40 are shown. In the particular example presented, the actuator 40 is a hydraulic lift or work cylinder 40 mechanically coupled to the work attachment. Although cylinders 40 are characterized in this disclosure as being lift cylinders, it should be understood that cylinders 40 may be any type of work cylinder, and that the disclosure is not limited to only applications involving lift cylinders. Additionally, any type of actuator or combinations thereof may be used, for example, linear hydraulic actuators and motors. An example of a hydraulic actuator 40 that is a motor 40 usable with the disclosed concepts herein is presented at FIG. 2A. The operation of first valve assembly 20 causes the work attachment 12 to be selectively raised or lowered in a lifting function. The lifting speed of the lift cylinder(s) 40 is a result of the flow through the first valve assembly 20. Flow through the first valve assembly 20 can be controlled by a pair of variable solenoid actuators 58, 60 acting on each end of the spool 24 of the valve 20. The variable solenoid actuators 58, 60 can be operated by the control system 50 via control lines 66, 70, respectively. Additionally where solenoids or solenoid actuators are referenced in the application, it should be noted that the associated valves could be voicecoil driven valves. Additionally, multi-stage valves incorporating a main stage valve that is pilot operated by valves utilizing solenoids and/or voicecoils may be used.

As shown, the first valve assembly 20 is a three-position, three-way valve in fluid communication with the pump 210, a tank reservoir 230, and the lift cylinder(s) 40. In the embodiment shown, first valve assembly 20 is movable from a closed or neutral position A, to a lifting position B, and to a lowering position C.

In the closed position A, ports 26A, 28A, and 30A are closed such that the pump 210 and tank reservoir 230 are both isolated from the lifting cylinder(s) 40. In this position the work attachment 12 is held in a static position and can be neither raised nor lowered.

In the lifting position B, the first valve assembly 20 is positioned such that ports 26B and 30B are placed in fluid communication with each other. This position allows for the pump 210 to be placed in fluid communication with the lifting cylinder(s) 40. Where the pump pressure exceeds the pressure induced by a load 44, the hydraulic lift cylinder(s) will cause the load 44 to be raised. In the lifting position, the tank reservoir 230 is blocked at port 28B.

In the lowering position C, the first valve assembly 20 is positioned such that ports 28C and 30C are placed in fluid communication with each other. This position allows for the tank reservoir 230 to be placed in fluid communication with the lifting cylinder(s) 40. The lowering position C allows for fluid to drain from the lifting cylinder(s) 40 to the tank reservoir 230, thereby allowing for the load 44 to be lowered.

The second valve assembly 120 is configured and arranged to selectively provide fluid communication between the pump 210 or reservoir 230 and one or more hydraulic lift or work cylinders 40 which are mechanically coupled to the work attachment. The operation of second valve assembly 120 allows for hydraulic fluid to cause the work attachment 12 to be selectively raised or lowered in a lifting function. The lowering speed of the lift cylinder(s) 40 can be a result of the flow through the second valve assembly 120. Flow through the second valve assembly 120 can be controlled by a pair of variable solenoid or voicecoil actuators 158, 160 acting on each end of the spool 124 of the valve 120. The variable solenoid or voicecoil actuators 158, 160 can be operated by the control system 50 via control lines 166, 170, respectively.

As shown, the second valve assembly 120 is a three-position, three-way valve in fluid communication with the pump 210, a tank reservoir 230, and the lift cylinder(s) 40. In the embodiment shown, second valve assembly 120 is movable from a closed or neutral position A, to a position B, and to position C. Positions B and C could be used for lifting or lowering, depending upon whether pump pressure is needed to prevent cavitation and whether the tank pressure is sufficient. In one embodiment, position B is typically used for lowering.

In the closed position A, ports 126A, 128A, and 130A of the second valve assembly 120 are closed such that the pump 210 and tank reservoir 230 are both isolated from the lifting cylinder(s) 40. In this position the work attachment 12 can generally be held in a static position and can be neither raised nor lowered. However, it the work attachment 12 could lower to some extent if the gravity load is such that a sufficient vacuum condition would be created. In one operational control scheme, the second valve assembly 120 would be in the closed position A when the first valve assembly 20 is also in its closed position A.

In the lowering position B, the second valve assembly 120 is positioned such that ports 126B and 130B are placed in fluid communication with each other. This position allows for the pump 210 to be placed in fluid communication with the lifting cylinder(s) 40 such that pump can provide fluid power to lower the load beyond what would be achieved by gravity alone. In the lowering position, the tank reservoir 230 is blocked at port 28B. In one operational control scheme, the second valve assembly 120 would be in the lowering position B when the first valve assembly 20 is also in its lowering position C.

In the lifting position C, the second valve assembly 120 is positioned such that ports 128C and 130C are placed in fluid communication with each other. This position allows for the tank reservoir 230 to be placed in fluid communication with the lifting cylinder(s) 40. The lifting position C allows for fluid to drain from the rod side of the lifting cylinder(s) 40 to the tank reservoir 230, thereby allowing for the load 44 to be raised. In one operational control scheme, the second valve assembly 120 would be in the lifting position C when the first valve assembly 20 is also in its lifting position B.

The Electronic Control System

The hydraulic system operates in various modes depending on demands placed on the work machine (e.g., by an operator). The electronic control system monitors and allows for the various modes to be initiated at appropriate times.

An electronic controller 50 monitors various sensors and operating parameters of the hydraulic system 214 to configure the hydraulic system 214 into the most appropriate mode. Examples of operational modes are a work circuit lifting mode and a fail operational mode.

Figure 3:
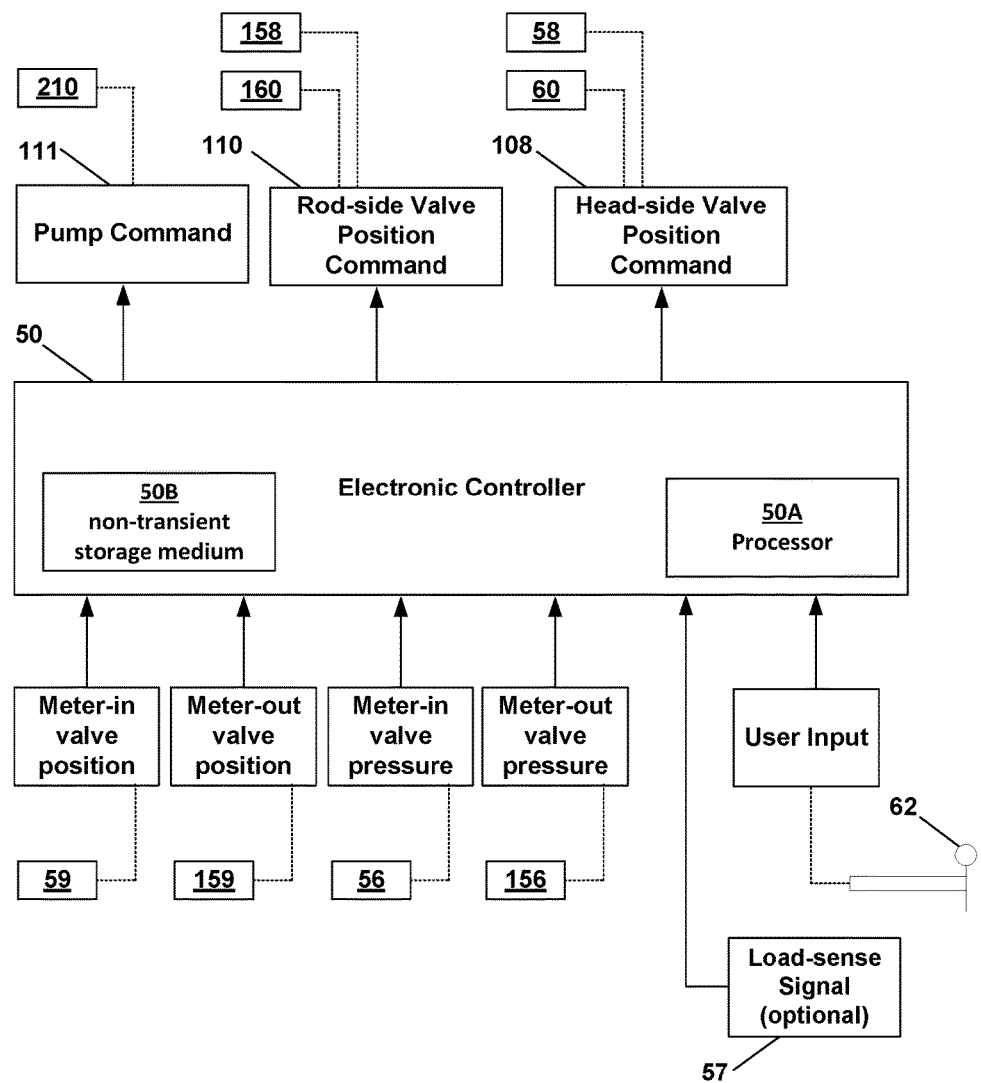
FIG. 3 is a schematic of an electronic control system for the hydraulic circuit shown in FIG. 2.

Referring to FIG. 3, the electronic controller 50 is schematically shown as including a processor 50A and a non-transient storage medium or memory 50B, such as RAM, flash drive or a hard drive. Memory 50B is for storing executable code, the operating parameters, the input from the operator interface while processor 50A is for executing the code.

Electronic controller 50 may have a number of inputs and outputs that may be used for implementing the work circuit lifting mode and the work circuit fail operational mode. For example, inputs and outputs may be in the form of pressure and position sensors on the first and second control valves 20, 120. Another example of an input is engine speed, which may be provided as a direct input into the electronic controller 50 or may be received from another portion of the control system via a control area network (CAN). The measured pump displacement, for example via a displacement feedback sensor, may also be provided.

One input into the electronic controller 50 is the lever position input from a lifting lever 62. In one embodiment, the lever position input is a direct digital signal from an electronic lever. The lifting lever 62 provides a user indication to the controller 50 that a load lifting operation by hydraulic lift cylinder(s) 40 is desired and also provides a means to control the raising and lowering of the load 44. Although lever 62 is characterized as a lifting lever, it should be understood that the disclosure is not limited to only lifting levers and that lever 62 can be any type of work lever without departing from the concepts disclosed herein. Other inputs to the controller are the signals from sensors 56, 59, 156, and 159. An optional load-sense signal 57 may also be provided to the controller or directly to the pump 210. In the embodiment shown, the load-sense demand is derived from the pressure sensors. The pressure and position inputs can also be used by the valve controller to calculate a flow rate through the valve itself.

Still referring to FIG. 3, a number of outputs from the electronic controller 50 are shown. One output is a valve position command 108 to the first control valve 20. In the particular embodiment shown, the valve command output 108 is a proportional signal to the solenoid or voicecoil valves 58, 60 of control valve 20 via control lines 66, 70. Another output is a valve position command 110 to the second control valve 120. In the particular embodiment shown, the valve command output 110 is a proportional signal to the solenoid or voicecoil valves 158, 160 of control valve 120 via control lines 166, 170. Another output may be a pump command output 111 to control the flow and/or pressure generated by the pump 210.

The electronic controller 50 may also include a number of algorithms or control schemes to correlate the inputs and outputs of the controller 502. In one embodiment, the controller 50 includes an algorithm to control the system in a work mode, as described further in the Method of Operation section below.

The electronic controller 50 may also store a number of predefined and/or configurable parameters and offsets for determining when each of the modes is to be initiated and/or terminated. As used herein, the term "configurable" refers to a parameter or offset value that can either be selected in the controller (i.e. via a dipswitch) or that can be adjusted within the controller.

Method of Operation

Figures 4, 5:
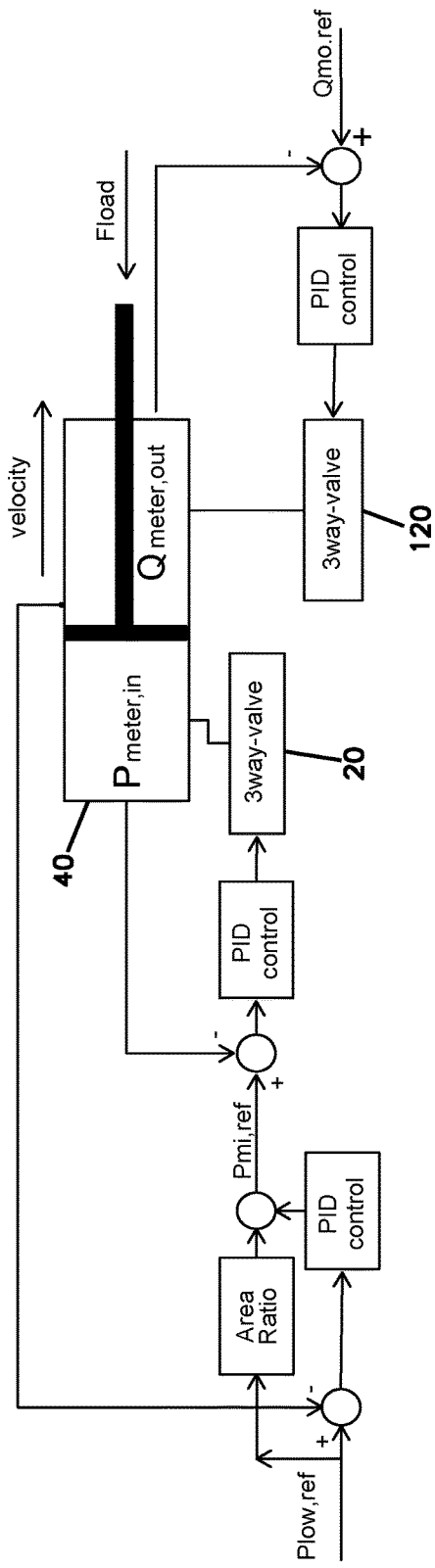
FIG. 4 is a schematic of a control algorithm associated with the electronic control system shown at FIGS. 2 and 3.
FIG. 5 is a table showing control modes of operation for the control valves associated with the system shown in FIG. 2 in comparison to a traditional system.

Referring to FIG. 5, the differences between the control methodology of the present application differs from a traditional control strategy for independent metering valves. As shown in the "traditional IFC controller" columns, the meter-in valve is in the flow control mode when the actuator is in a passive state and in a pressure control mode when the actuator is in the overrunning state. Likewise, the meter-out valve is in the pressure control mode when the actuator is in a passive state and in a flow control mode when the actuator is in the overrunning state. As stated previously, this type of control results in the creation of an undesirable velocity ripple at the actuator when the actuator shifts between passive and overrunning states.

In the "cross port IFC controller" columns a new approach is shown in which the meter-in valve is always operating in the pressure control mode and in which the meter-out valve is always operating in the flow control mode. As neither valve switches between flow control and pressure control modes, the creation of a velocity ripple is entirely avoided.

The pressure control mode for the meter-in valve can be based on the pressure on the same side of the actuator that the valve is located on and/or on the opposite side. In the latter case, this control is referenced as cross port pressure control. In one example, the meter-in valve is controlled to meet a first pressure setpoint when the actuator is in the passive state and a second pressure setpoint when the actuator is in the overrunning state. The first pressure setpoint is set such that the meter out pressure is regulated to be low. The second pressure setpoint is set at a value that is sufficient to prevent cavitation within the actuator.

Referring to the control algorithm schematic at FIG. 4, the first pressure setpoint is shown as $P_{mi,\,ref}$ and the second pressure setpoint is shown as $P_{low,ref}$. In FIG. 4, the actuator 40 is in a passive state ($F_{load}$ is opposite direction of actuator) and the first valve assembly 20 is thus the valve in the pressure control mode. As such, the actuators 56, 58 control the position of the valve 20 such that the pressure measured at sensor 156 ($P_{meter,in}$) meets the first pressure setpoint $P_{mi,ref}$. If the actuator 40 were in the overrunning state, the actuators 56, 58 would control the position of the valve 20 such that the pressure measured at sensor 156 ($P_{meter,in}$) meets the second pressure setpoint $P_{low,ref}$. The area ratio and PID control can also be utilized in the control algorithm for the pressure setpoint control.

With continued reference to FIG. 4, the valve assembly 120 is shown as being the meter-out valve. Thus, valve assembly 120 is placed in the flow control mode by the controller 50. In the flow control mode, the position of the meter-out valve assembly is controlled such that the flow through the valve meets a first flow control set point. As shown, the first flow control set point is represented as $Q_{mo,ref}$. The first flow control set point can be a setpoint equal to the user demand multiplied by the area ratio of the valve assembly. Reference to maps can also be utilized such that the flow control setpoint takes into account the operating mode of the actuator (e.g. acceleration, braking, switching direction, etc.).

With continued reference to FIG. 4, it can be seen that standard PID (proportional-integral-derivative) control loops can be used for the above described control of the valve assemblies 20, 120. The above described approach ensures that the controller automatically adapts to varying load conditions. Accordingly, all operations of the actuator (e.g. acceleration, braking, switching direction, etc.) and actuator states are automatically accounted for with the disclosed system and method.

Figure 10:
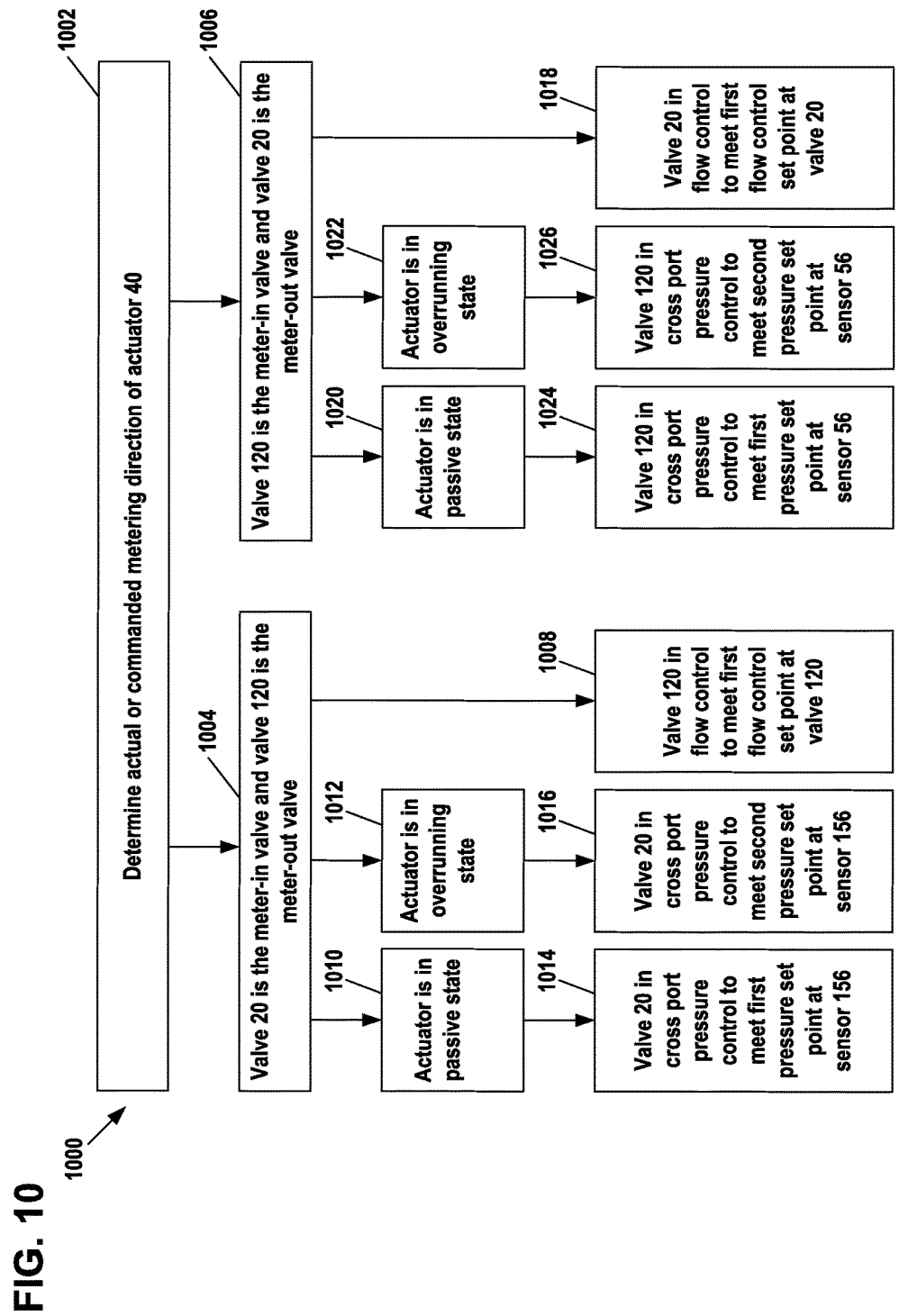
FIG. 10 is a flow chart showing a process for controlling the system shown in FIG. 2.

For the purpose of further illustration, FIG. 10 shows the above described approach is presented in schematic form at FIG. 10 as method 1000. At step 1002, the metering direction of the actuator 40 is determined. At step 1004, it has been determined that valve 20 is the meter-in valve and that valve 120 is the meter-out valve. In this circumstance, at step 1008, valve 120 is placed in the flow control mode to meet the first flow control setpoint at the valve 120. The actuator 40 is also determined as being in a passive or overrunning state within the controller at steps 1010, 1012, for example by using the pressure signal values. Where the actuator is in a passive state at step 1010, valve 20 is placed in cross port pressure control to meet the first pressure set point at sensor 156 at step 1014. Where the actuator is in an overrunning state at step 1016, valve 20 is placed in cross port pressure control to meet the second pressure set point at sensor 156 at step 1016. Step 1006 is followed where the metering direction of the actuator is such that valve 120 is the meter-in valve and that valve 20 is the meter-out valve. In this circumstance, at step 1018, valve 20 is placed in the flow control mode to meet the first flow control setpoint at the valve 20. The actuator 40 is also determined as being in a passive or overrunning state within the controller at steps 1020, 1022, for example, by using the pressure signal values. Where the actuator is in a passive state at step 1020, valve 120 is placed in cross port pressure control to meet the first pressure set point at sensor 56 at step 1024. Where the actuator is in an overrunning state at step 1026, valve 120 is placed in cross port pressure control to meet the second pressure set point at sensor 56 at step 1026. It is noted that the work machine 10 and work circuit 200 may contain a plurality of work sections, each of which including an actuator 40 and valves 20, 120 for performing various tasks of the work machine (e.g. lifting, side shift, tilt, etc.). In some examples, the valves 20, 120 are packaged together in a single housing assembly. In some examples, multiple housing assemblies are assembled together such that all of the valves associated with the work sections are provided as a overall assembly, as is the case for some models of the Eaton CMA Advanced Mobile Valve.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the disclosure.

What is claimed is:

1. A method for controlling valve assemblies associated with an actuator in an electro-hydraulic system, the method comprising the steps of:
   (a) providing first and second valve assemblies, each valve assembly having at least one of a pressure sensor and a position sensor in communication with an electronic system controller, the valve assemblies being in fluid communication with the hydraulic actuator;
   (b) monitoring hydraulic fluid flow to identify either of the first and second valve assemblies as a meter-in valve in which hydraulic fluid flow from the valve assembly to the actuator and the other of the first and second valve assemblies as a meter-out valve in which hydraulic fluid flows from the actuator to the valve assembly;
   (c) controlling the valve most recently identified as the meter-in valve to maintain a pressure setpoint value; and
   (d) controlling the valve most recently identified as the meter-out valve to maintain a hydraulic fluid flow rate value.

2. The method for controlling valve assemblies of claim 1, further including the step of:
   (a) determining whether the actuator is in a passive state or an overrunning state and controlling the valve most recently identified as the meter-in valve to maintain a first pressure setpoint value when the actuator is in a passive state and to maintain a second pressure setpoint value when the actuator is in an overrunning state.

3. The method of controlling valve assemblies of claim 1, wherein the step of controlling the valve most recently identified as the meter-in valve to maintain a pressure setpoint value is controlled with reference to hydraulic pressure at a location between the meter-out valve and the actuator.

4. The method of controlling valve assemblies of claim 1, wherein the valve assemblies include a first valve assembly in fluid communication with a head side of the actuator and a second valve assembly in fluid communication with a rod side of the actuator.

5. The method of controlling valve assemblies of claim 1, wherein the hydraulic actuator is a hydraulic motor.

6. The method of controlling valve assemblies of claim 4, wherein the actuator is a linear actuator associated with a lifting function of a work machine.

7. The method of controlling valve assemblies of claim 1, wherein each of the first and second valve assemblies is a spool and sleeve type valve.

8. The method of controlling valve assemblies of claim 1, wherein the steps of controlling the first and second valve assemblies are performed by an electronic controller.

9. A non-transitory computer-readable storage medium comprising instructions that, when executed by a control unit of an electronic computing system, causes the control unit to execute a method for controlling valve assemblies associated with an actuator in an electro-hydraulic system, the method comprising the steps of:
   (a) providing first and second valve assemblies, each valve assembly having at least one of a pressure sensor and a position sensor in communication with an electronic system controller, the valve assemblies being in fluid communication with the hydraulic actuator;
   (b) monitoring hydraulic fluid flow to identify either of the first and second valve assemblies as a meter-in valve in which hydraulic fluid flow from the valve assembly to the actuator and the other of the first and second valve assemblies as a meter-out valve in which hydraulic fluid flows from the actuator to the valve assembly;
   (c) controlling the valve most recently identified as the meter-in valve to maintain a pressure setpoint value; and
   (d) controlling the valve most recently identified as the meter-out valve to maintain a hydraulic fluid flow rate value.

10. The non-transitory computer-readable storage medium of claim 9, further including the step of:
    (a) determining whether the actuator is in a passive state or an overrunning state and controlling the valve most recently identified as the meter-in valve to maintain a first pressure setpoint value when the actuator is in a passive state and to maintain a second pressure setpoint value when the actuator is in an overrunning state.

11. The non-transitory computer-readable storage medium of claim 9, wherein the step of controlling the valve most recently identified as the meter-in valve to maintain a pressure setpoint value is controlled with reference to hydraulic pressure at a location between the meter-out valve and the actuator.

12. The non-transitory computer-readable storage medium of claim 9, wherein the valve assemblies include a first valve assembly in fluid communication with a head side of the actuator and a second valve assembly in fluid communication with a rod side of the actuator.

13. The non-transitory computer-readable storage medium of claim 9, wherein the hydraulic actuator is a hydraulic motor.

14. The non-transitory computer-readable storage medium of claim 13, wherein the actuator is a linear actuator associated with a lifting function of a work machine.

15. The non-transitory computer-readable storage medium of claim 9, wherein each of the first and second valve assemblies is a spool and sleeve type valve.

16. The non-transitory computer-readable storage medium of claim 9, wherein the steps of controlling the first and second valve assemblies are performed by an electronic controller.

\* \* \* \* \*